(12) United States Patent
Roberts

(10) Patent No.: US 8,733,767 B2
(45) Date of Patent: May 27, 2014

(54) APPARATUS AND SYSTEM FOR TRANSPORTING A KAYAK

(75) Inventor: Douglas E. Roberts, Pacifica, CA (US)

(73) Assignee: Douglas E. Roberts, Pacifica, CA (US)

( * ) Notice: Subject to any disclaimer, the term of this patent is extended or adjusted under 35 U.S.C. 154(b) by 426 days.

(21) Appl. No.: 12/620,565

(22) Filed: Nov. 17, 2009

(65) Prior Publication Data

US 2011/0115179 A1    May 19, 2011

(51) Int. Cl.
    *B62B 1/00*    (2006.01)

(52) U.S. Cl.
    USPC .................................. 280/47.331; 280/414.2

(58) Field of Classification Search
    USPC ........ 280/47.331, 414.1, 414.2; 114/344, 364
    See application file for complete search history.

(56) References Cited

U.S. PATENT DOCUMENTS

| | | | | |
|---|---|---|---|---|
| 2,042,598 A * | 6/1936 | Harvey | ............................ | 440/53 |
| 3,068,024 A * | 12/1962 | Berliner | ..................... | 280/414.3 |
| 3,195,919 A * | 7/1965 | Lossman | .................. | 280/124.13 |
| 3,445,018 A * | 5/1969 | Reagan | ........................... | 414/462 |
| 3,687,476 A * | 8/1972 | Abbott | ........................ | 280/47.32 |
| 3,982,292 A * | 9/1976 | Johnson | .......................... | 114/344 |
| 4,936,595 A * | 6/1990 | Cunningham | ............ | 280/47.331 |
| 6,032,964 A | 3/2000 | Capobianco | | |
| 6,189,478 B1 * | 2/2001 | Myers et al. | ................... | 114/344 |
| 7,527,013 B2 * | 5/2009 | Bramson | ...................... | 114/344 |
| 8,091,501 B2 * | 1/2012 | Lazarevic | ...................... | 114/344 |
| 2006/0017246 A1 * | 1/2006 | Singer | ..................... | 280/47.331 |
| 2008/0035045 A1 * | 2/2008 | MacDonald et al. | ......... | 114/344 |
| 2010/0289235 A1 * | 11/2010 | Miller | ...................... | 280/47.331 |

* cited by examiner

*Primary Examiner* — J. Allen Shriver, II
*Assistant Examiner* — Bridget Avery

(57) ABSTRACT

An apparatus includes a first carrier device having a first upright. A first axle and a first wheel are joined proximate a first distal end of the first upright. A first support plate is joined to the first upright above the first wheel. A second carrier device has a second upright. A second axle and a second wheel are joined proximate a first distal end of the second upright. A second support plate is joined to the second upright above the second wheel. An adjustment bar has a first end, a second end and a plurality of adjustment positions extending inward from the second end. The first end is joined proximate a second distal end of the first upright. A one of the plurality of adjustment positions is joined to a second distal end of the second upright, whereby a distance between the first and the second upright is selected.

15 Claims, 2 Drawing Sheets

APPARATUS AND SYSTEM FOR TRANSPORTING A KAYAK

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

The present invention relates generally to boats. More particularly, the invention relates to a portable kayak carrier.

BACKGROUND OF THE INVENTION

The present invention provides means for transporting a kayak across dry land. The size and shape of typical kayaks cause them to be awkward to carry, especially for one person. This makes it difficult for a person to transport a kayak from an automobile or storage area to the water. It is therefore an objective of the present invention to provide a kayak carrier that enables a user to easily transport a kayak across dry land without help from another person.

Currently, there are existing kayak carriers. However, many of these currently known carriers require straps or complicated locking mechanisms to attach to kayaks. Some currently known kayak carriers are too large to be stowed in the kayak, which means that the user must leave the carrier at the water's edge while kayaking or leave the kayak unattended at the water's edge while returning the carrier to an automobile or storage area.

In view of the foregoing, there is a need for improved techniques for providing a kayak carrier that can be stowed on a kayak and does not require straps or locking mechanisms to attach to a kayak.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a diagrammatic front view, and FIG. 1B is a diagrammatic side view;

FIG. 2A is a diagrammatic side view, and FIG. 2B is a diagrammatic rear view.

Figure 1A:
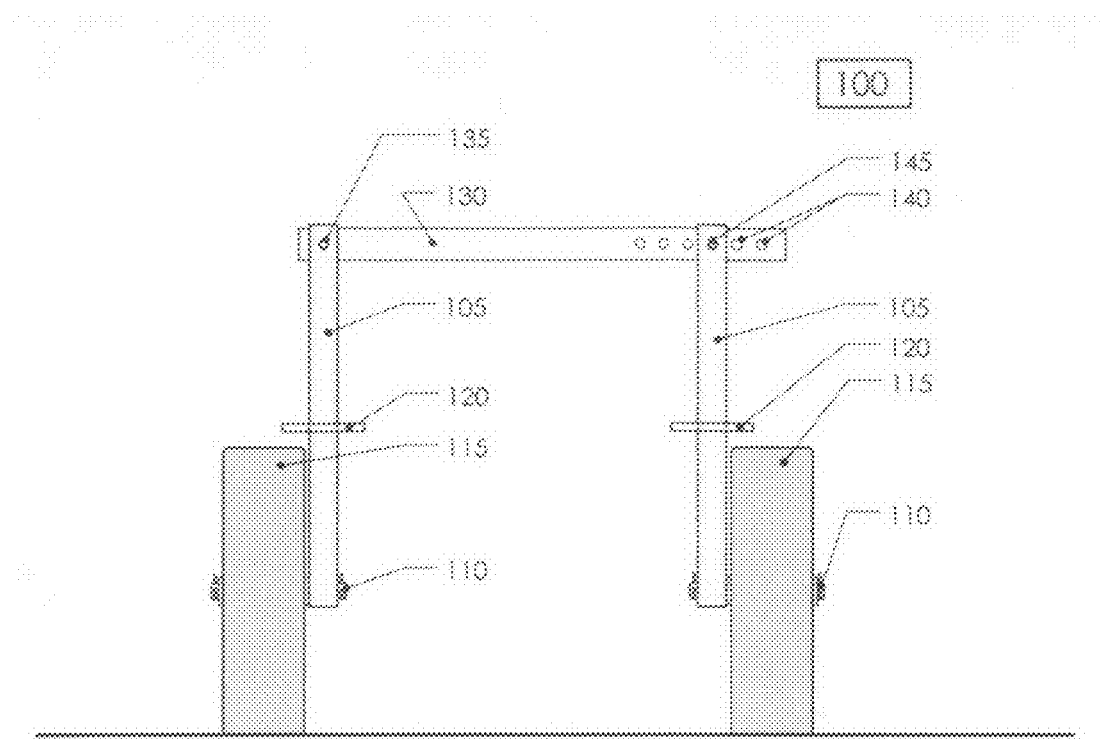
FIGS. 1A and 1B illustrate an exemplary kayak carrier, in accordance with an embodiment of the present invention.

Unless otherwise indicated illustrations in the figures are not necessarily drawn to scale.

DETAILED DESCRIPTION OF THE PREFERRED EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention will now be described in detail with reference to embodiments thereof as illustrated in the accompanying drawings.

Detailed descriptions of the preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

Preferred embodiments of the present invention provide portable kayak carriers that enable a user to easily transport a kayak across dry land single-handedly. Preferred embodiments have the advantage over other kayak carriers in that they need no straps or complicated locking devices and are quickly and easily installed and removed. Preferred embodiments also easily and compactly fit into the storage area of virtually every "sit on top" kayak with a hatch leaving ample space for other items. This generally eliminates the need to leave the kayak unattended at the water's edge while the user returns the kayak carrier to an automobile or storage area before using the kayak or the need to return to the automobile or storage area to retrieve the carrier while leaving the kayak and equipment unattended at water's edge when finished using the kayak.

Figure 1B:
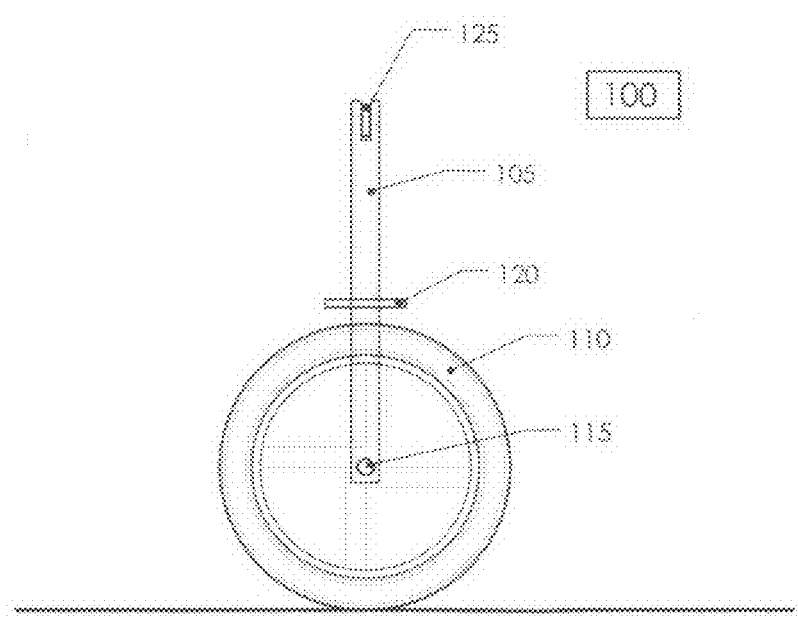

FIGS. 1A and 1B illustrate an exemplary kayak carrier 100, in accordance with an embodiment of the present invention. FIG. 1A is a diagrammatic front view, and FIG. 1B is a diagrammatic side view. In the present embodiment, kayak carrier 100 is a two-part device with two tubular uprights 105 that are installed from the underside of a kayak hull by being inserted into two of the scupper holes of a "sit on top" kayak. Scupper holes are holes in the bottom of the kayak that enable water to drain out of the kayak. To fit typical scupper holes, tubular uprights 105 are preferably ⅞ of an inch in diameter and about one foot long. However, the tubular uprights in alternate embodiments may be larger or smaller to fit scupper holes and kayaks of various sizes. In the present embodiment, each tubular upright 105 has a permanently affixed axle 110 and wheel 115. In the present embodiment, axle 110 is preferably ½ inch in diameter and wheels 115 are preferably nine inches in diameter to accommodate most typical kayaks; however, the axels and wheels in alternate embodiments may be various different sizes.

Rounded and padded hull support plates 120, similar to large washers, are placed above the top of wheels 115 on each upright 105 and are supported by permanent or removable pins through uprights 105, thus allowing adequate clearance between wheels 115 and the kayak. In the present embodiment, support plates 120 are preferably 2½ inches in diameter; however, support plates in alternate embodiments may be elongated, larger or smaller providing they are larger in diameter than the scupper holes and provide adequate support of the kayak. Those skilled in the art, in light of the present teachings, will readily recognize that alternate means for providing clearance between the wheels and the body of the kayak may be used such as, but no limited to, plates of various different shapes, pins, plugs, o-rings, etc. In the present embodiment in order to generally prevent support plates 120 from falling off during storage, flexible tubing, not shown, with the same inner diameter as the outer diameter of uprights 105 may be placed on uprights 105 from the top of support plates 120 to the bottom of alignment bar slots 125. This short length of flexible tubing may also serve the purpose of shimming and protecting the inside surface of the scupper holes when kayak carrier 100 is in use. Various different materials may be used for the flexible tubing including, but not limited to, vinyl and rubber. In alternate embodiments the support plates may be permanently attached to the uprights for example, without limitation, by being welded onto the uprights or being formed as part of the uprights.

In the present embodiment, alignment bar slots 125 in the tops of uprights 105 are parallel to the direction of axles 110 which are affixed at the bottom of each upright 105, and axles 110 are affixed perpendicularly to the length of the kayak. Alignment bar slots 125 accommodate a flat alignment bar 130 that generally prevents any rotation of uprights 105 and holds the alignment of wheels 115 straight so the kayak can easily be pulled forward or backward. The width of alignment bar slots 125 in uprights 105 is slightly larger than the thickness of alignment bar 130. In the present embodiment, the width of alignment bar 130 is preferably about the same or smaller than that of the outside dimension of tubular uprights 105 to allow its insertion into the scupper hole along with the upright 105 . . . . The length of alignment bar 130 is long enough to accommodate kayaks of differing widths or beams. One end of alignment bar 130 is affixed to alignment bar slot 125 on one upright 105 by a permanent attachment means 135, such as, but not limited to, a dowel, pin or bolt, through the top of upright 105 to permanently connect alignment bar 130 to upright 105 and to facilitate the unrestricted up and down pivoting of alignment bar 130 around attachment means 135. The other end of alignment bar 130 does not have a permanent pin, dowel or bolt that permanently attaches alignment bar 130. Instead, alignment bar 130 comprises holes 140 for a removable spring pin 145 or other type of attachment means that are spaced approximately ⅝ of an inch apart to accommodate differing scupper hole spacing in differing models and brands of "sit on top" kayaks. In alternate embodiments the spacing of the holes may be different, and other alternate embodiments may be made for specific kayak models and may not be adjustable. In yet other alternate embodiments the attachment points on both uprights may be removable and adjustable.

In the present embodiment, uprights 105, axles 110, support plate 120, and alignment bar 130 are preferably made of aluminum. However, these components may be made of various different materials in alternate embodiments such as, but not limited to, other types of metal, plastic, etc. Wheels 115 may be made of various different materials including, but not limited to, rubber, plastic, metal, etc.

In typical use of the present embodiment, uprights 105 are installed from the underside of the kayak hull by being inserted into two of the scupper holes of the "sit on top" kayak. When kayak carrier 100 is installed, the kayak becomes an integral part of kayak carrier 100. Once both uprights 105 are inserted with the alignment of wheels 115 in line with the length of the kayak, alignment bar 130 is swung down into alignment bar slot 125 at the top of upright 105 with removable spring pin 145, and removable spring pin 145 is inserted through upright 105 and through a hole 140 in alignment bar 130 that best suits the width of the scupper holes in the kayak. Kayak carrier 100 is then fully installed, as shown by way of example in FIGS. 2A and 2B, and the kayak is ready to haul to the water or back to the parking lot. In alternate embodiments, the alignment bar may be located closer to the wheels of the kayak carrier. In these embodiments, the alignment bar is under the kayak when installed. These embodiments may not require support plates as the alignment bar can maintain the clearance between the wheels and the kayak. In another alternate embodiment, the alignment bar at the top of the uprights is permanently attached to the uprights and the axles and wheels can be removed. This embodiment is installed by removing the axles and wheels and inserting the uprights through the scupper holes at the deck of the kayak rather than the bottom of the kayak. Then the support plates, axels and wheels are reinstalled on the uprights. In the present embodiment, there are no front and back or right and left installation requirements. Each of the two parts of kayak carrier 100 is interchangeable and reversible.

Figure 2A:
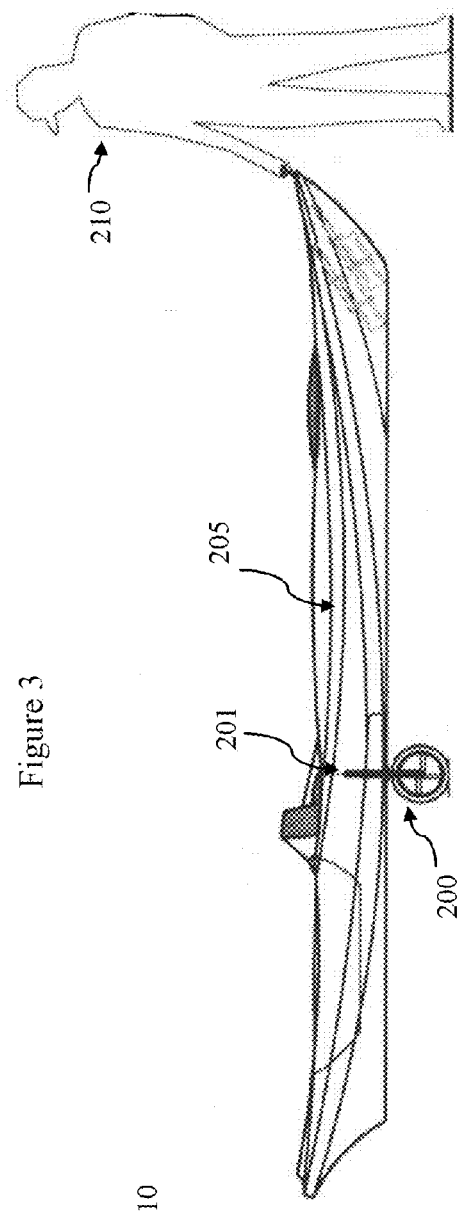
FIGS. 2A and 2B illustrate an exemplary kayak carrier in use on a kayak, in accordance with an embodiment of the present invention.
Figure 2B:
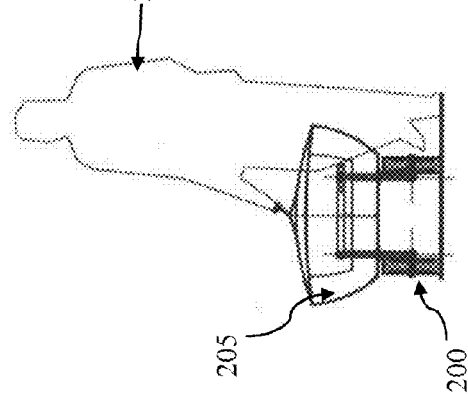

FIGS. 2A and 2B illustrate an exemplary kayak carrier 200 in use on a kayak 205, in accordance with an embodiment of the present invention. FIG. 2A is a diagrammatic side view, and FIG. 2B is a diagrammatic rear view. In the present embodiment, kayak carrier 200 is installed on kayak by slipping the two uprights 201 of kayak carrier 200 into scupper holes 350 on the bottom of kayak 205. The alignment bar is permanently attached to one of the upright parts of the carrier. This enables user 210 to rotate the alignment bar and lock it into a slot on the top of the other carrier. It is then held in place by the insertion of a removable spring pin, and kayak carrier 200 is installed. The alignment bar may be permanently attached to one of the two parts of the carrier. It swivels in a downward motion into the top, into a slot of the other carrier. A user 210 may now easily transport kayak 205 to the water's edge or back to the automobile or storage area. As an antitheft measure, kayak carrier 200 may be locked onto kayak 205 by using a padlock in lieu of the removable alignment bar pin. When installing kayak carrier 200 on different types of kayaks, scupper holes in various different locations on the kayaks may be used.

Figure 3:
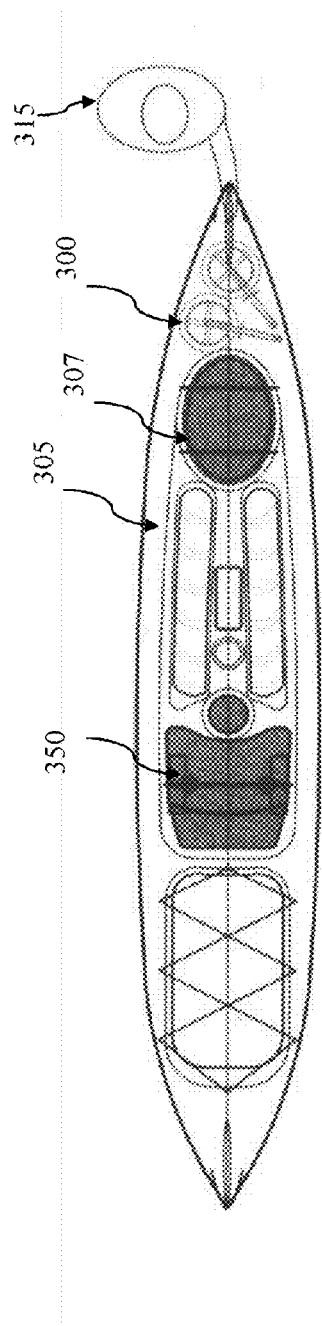
FIG. 3 is a diagrammatic top view of an exemplary kayak carrier stowed in a kayak, in accordance with an embodiment of the present invention.

FIG. 3 is a diagrammatic top view of an exemplary kayak carrier 300 stowed on a kayak 305, in accordance with an embodiment of the present invention. In the present embodiment, kayak carrier 300 is small enough to fit in a storage area in the bow in front of storage hatch 307 of a typical sit on top kayak 305 having scupper holes 350.

Alternate embodiments of the present invention may be implemented in more than two pieces. For example without limitation, one alternate embodiment may comprise a two-piece alignment bar along with two uprights with wheels. In this embodiment one end of each piece of the alignment bar is permanently attached to an upright so that the pieces of the alignment bar are free to rotate. The two pieces comprise means for attaching to each other at the other ends such as, but not limited to, holes and one or more spring pins, a bolt in a slot, a clamp, etc. Other alternate embodiments may comprise more than two sets of uprights and wheels for example, without limitation, three or four uprights and wheels depending on factors such as, but not limited to, the size of the kayak, the number and configuration of scupper holes, etc. Yet other alternate embodiments may comprise more than one wheel on each upright for example, without limitation, two wheels with one wheel on each end of the axle, on one or both sides of the upright.

Other alternate embodiments may be implemented without uprights that are inserted all of the way through the scupper holes. For example, without limitation, one alternate embodiment may comprise uprights with plugs at the top which are inserted into the scupper holes and are appropriately sized to securely grip the scupper holes. The uprights in this embodiment are preferably connected by an alignment bar that may be located anywhere along the uprights below the plugs. Other alternate embodiments may be configured similarly with kayak holding means other than plugs such as, but not limited to, suction cups, a kayak cradle, etc.

Having fully described at least one embodiment of the present invention, other equivalent or alternative methods of providing a portable kayak carrier according to the present invention will be apparent to those skilled in the art. The invention has been described above by way of illustration, and the specific embodiments disclosed are not intended to limit the invention to the particular forms disclosed. For example, the particular implementation of the carrier may vary depending upon the particular type of object being transported. The carriers described in the foregoing were directed to kayak carrying implementations; however, similar techniques are to provide carriers to transport objects other than kayaks such as, but not limited to, canoes, sleds, storage containers, etc. Implementations of the present invention for use on various types of objects are contemplated as within the scope of the present invention. The invention is thus to cover all modifications, equivalents, and alternatives falling within the spirit and scope of the following claims.

Claim elements and steps herein have been numbered and/or lettered solely as an aid in readability and understanding. As such, the numbering and lettering in itself is not intended to and should not be taken to indicate the ordering of elements and/or steps in the claims.

What is claimed is:

1. An apparatus comprising:
a first carrier device being configured to be operable for supporting a sit on top kayak, said first carrier device having a first straight upright; a first axle joined proximate a first distal end of said first straight upright; a first wheel rotatably joined to said first axle; and a first support plate joined to said first straight upright above said first wheel and being configured for contacting a portion of a bottom of the sit on top kayak;

a second carrier device being configured to be operable for supporting a sit on top kayak, said second carrier device having a second straight upright; a second axle joined proximate a first distal end of said second straight upright; a second wheel rotatably joined to said second axle; and a second support plate joined to said second straight upright above said second wheel and being configured for contacting a portion of the bottom of the sit on top kayak; and an adjustment bar having a first end, a second end and a plurality of adjustment positions extending inward from said second end, said first end being rotatably joined proximate a second distal end of said first straight upright, and a one of said plurality of adjustment positions being removably joined to a second distal end of said second straight upright, wherein said first straight upright, said second straight upright and said adjustment bar have diameters suitable for insertion through scupper holes of the sit on top kayak, whereby a distance between said first straight upright and said second straight upright is selected and said first wheel and said second wheel are in generally parallel planes.

2. The apparatus as recited in claim 1, wherein said one of said plurality of adjustment positions is joined to said second distal end of said second straight upright with a removable spring pin.

3. The apparatus as recited in claim 1, wherein said first straight upright has a first slot proximate said second distal end where said slot is parallel to said first axle and said first slot has dimensions suitable for accepting said first end of said adjustment bar within said first slot, and said second straight upright has a second slot at said second distal end where said second slot is parallel to said second axle and said second slot has dimensions suitable for accepting said one of said plurality of adjustment positions of said adjustment bar within said second slot.

4. The apparatus as recited in claim 1, wherein said first straight upright and said second straight upright are tubular.

5. The apparatus as recited in claim 1, wherein said first support plate and said second support plate have padded surfaces.

6. The apparatus as recited in claim 1, wherein said first support plate and said second support plate are fixedly joined to said first straight upright and said second straight upright respectively.

7. The apparatus as recited in claim 4, wherein said first support plate and said second support plate are larger than openings of scupper holes.

8. The apparatus as recited in claim 4, wherein said first carrier device and said second carrier device are configured with dimensions for storage within a storage area beneath a hatch of the sit on top kayak.

9. The apparatus as recited in claim 4, wherein a width of said adjustment bar is equal to, or less than a diameter of said first straight upright or said second straight upright.

10. A system comprising:
a first carrier device being configured to be operable for supporting a sit on top kayak, said first carrier device having a first tubular straight upright having dimensions suitable for insertion into scupper holes of the sit on top kayak; a first axle joined proximate a first distal end of said first straight tubular upright; a first wheel rotatably joined to said first axle; and a first support plate, being configured for contacting a portion of a bottom of the sit on top kayak, having dimensions larger than openings of the scupper holes and being joined to said first tubular upright above said first wheel;

a second carrier device being configured to be operable for supporting a sit on top kayak, said second carrier device having a second straight tubular upright having dimensions suitable for insertion into scupper holes of the sit on top kayak; a second axle joined proximate a first distal end of said second straight tubular upright; a second wheel rotatably joined to said second axle; and a second support plate, being configured for contacting a portion of the bottom of the sit on top kayak, having dimensions larger than openings of the scupper holes and being joined to said second tubular upright above said second wheel; and an adjustment bar having a first end, a second end and a plurality of adjustment positions extending inward from said second end, said adjustment bar further having dimensions suitable for insertion into scupper holes of the sit on top kayak, said first end being rotatably joined proximate a second distal end of said first straight tubular upright, and a one of said plurality of adjustment positions being removably joined to a second distal end of said second straight tubular upright, whereby a distance between said first straight tubular upright and said second straight tubular upright is selectable and said first wheel and said second wheel are rotatable in generally parallel planes.

11. The system as recited in claim 10, wherein said one of said plurality of adjustment positions is joined to said second distal end of said second straight tubular upright with a removable spring pin.

12. The system as recited in claim 10, wherein said first straight tubular upright has a first slot proximate said second distal end where said slot is parallel to said first axle and said first slot has dimensions suitable for accepting said first end of said adjustment bar within said first slot, and said second straight tubular upright has a second slot at said second distal end where said second slot is parallel to said second axle and said second slot has dimensions suitable for accepting said one of said plurality of adjustment positions of said adjustment bar within said second slot.

13. The system as recited in claim 10, wherein said first support plate and said second support plate have padded surfaces for contacting the sit on top kayak.

14. The system as recited in claim 10, wherein said first support plate and said second support plate are fixed joined to said first straight tubular upright and said second straight tubular upright respectively.

15. The system as recited in claim 10, wherein said first carrier device and said second carrier device are configured with dimensions for storage within a storage area beneath a hatch of the sit on top kayak.

* * * * *